2,665,162

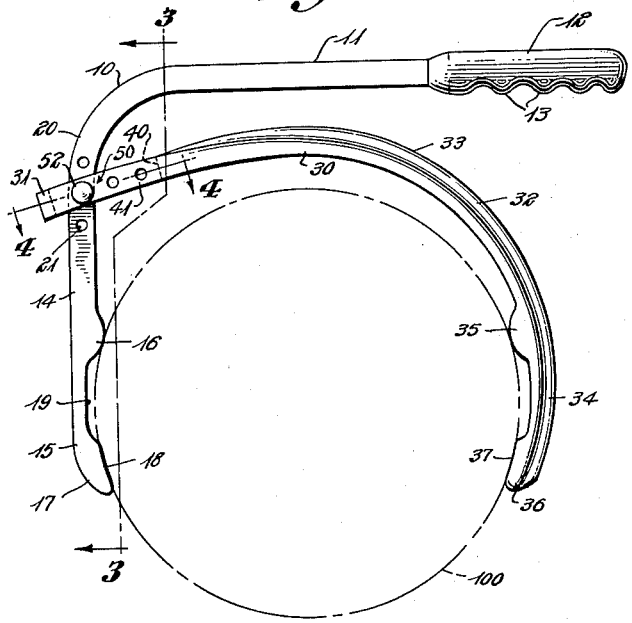
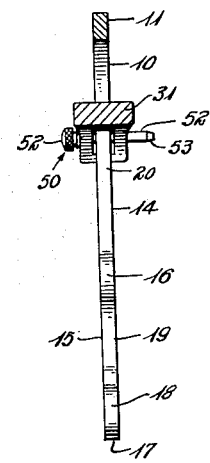
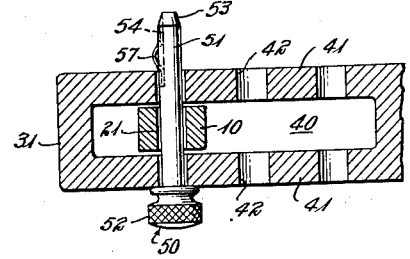
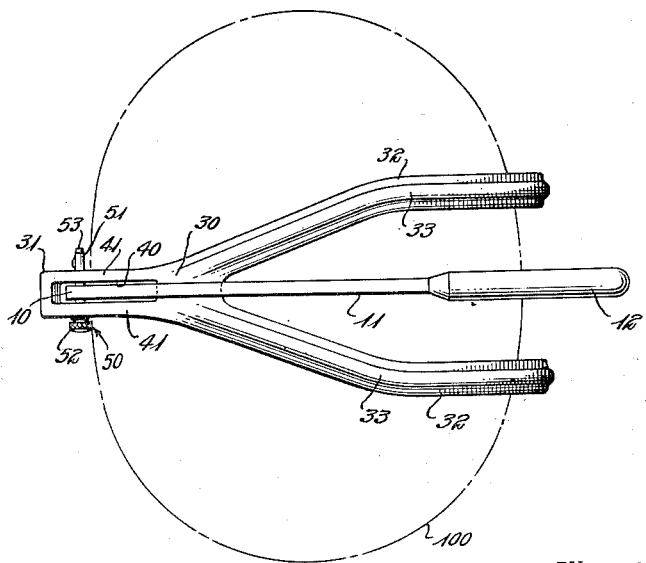
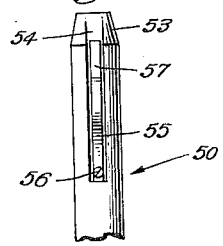
INVENTORS
Scott Moore,
Edward J. Meyers and
Patrick R. Nolan
BY Stevens, Davis, Miller and Mosher
ATTORNEYS Jan. 5, 1954   S. MOORE ET AL   2,665,162
WATERMELON CARRIER
Filed May 1, 1951   2 Sheets-Sheet 2
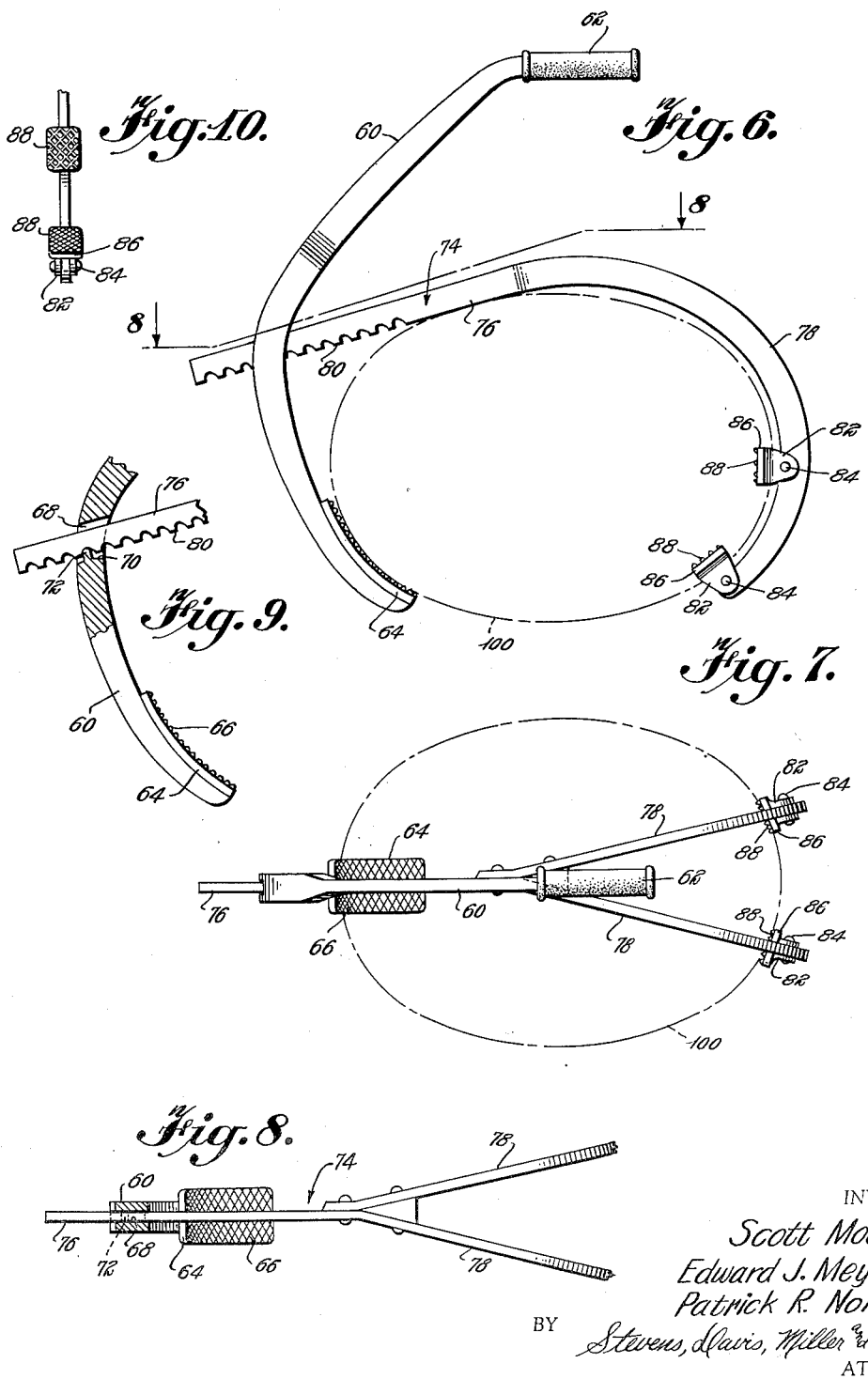
INVENTOR
Scott Moore,
Edward J. Meyers and
Patrick R. Nolan
BY Stevens, Davis, Miller & Mosher
ATTORNEYS Patented Jan. 5, 1954

UNITED STATES PATENT OFFICE 2,665,162

WATERMELON CARRIER

Scott Moore, Edward J. Meyers, and Patrick R. Nolan, Oklahoma City, Okla.

Application May 1, 1951, Serial No. 223,896

4 Claims. (Cl. 294—16)

This invention relates to a hand implement for transporting bulky articles and more particularly to a hand implement for transporting watermelons.

There has been no suitable hand implement developed which would effectively alleviate a large proportion of the energy necessary to transport bulky articles manually. This is found particularly true with regard to the harvesting and transporting of large bulky fruits and vegetables such as watermelons and pumpkins. Normally a laborer during the harvest season is restricted to handling but a single watermelon at a time. This restriction on handling is not due to any weight limitation, but rather resides in the fact that the watermelon is so bulky. As is the case, the watermelon is a fruit in the shape of a large ellipsoid and possesses a smooth hard skin. Consequently, it is a difficult fruit to hold in just one hand because of its size, shape, and hard surface. Also it is equally difficult to hold one beneath an arm since its smooth hard surface prevents the carrier from squeezing the fruit to slightly deform the area beneath the arm in order to hold it securely. In addition, the smooth surface slips considerably when in contact with a textile material. Consequently, it is necessary when handling watermelons manually to grasp a single fruit in both hands in order to hold it securely while transporting it.

Accordingly, the present invention is directed to a hand implement which will facilitate the harvesting and transporting of watermelons manually. The present invention provides apparatus consisting of a pair of members mounted together pivotally to form a jaw for receiving a watermelon. One of the members is extended beyond the pivotal connection to form a handle which in turn controls the position of the jaw. In use, a laborer holds an implement in each hand and by proper manipulation of the handles, he can grasp or release a watermelon with each implement.

It is therefore an object of this invention to provide an implement whereby a laborer can harvest and transport two watermelons at one time.

It is a further object to provide an implement which will make the harvesting and transporting of watermelons more economical and efficient than heretofore.

Other objects and advantages will become apparent from a detailed consideration of the following description when taken in conjunction with the drawings in which:

Figure 1 is a view in side elevation showing the implement of the present invention grasping a watermelon;

Figure 2 is a view in plan similar to Figure 1;

Figure 3 is a view in vertical section of the implement as shown in Figure 1 taken along line 3—3;

Figure 4 is a view in horizontal section showing the connection of the implement illustrated in Figure 1 taken along line 4—4;

Figure 5 is a plan view of the connection pin;

Figure 6 is a view in side elevation showing a modification of the implement of the present invention grasping a watermelon;

Figure 7 is a view in top plan similar to Figure 6;

Figure 8 is a view in horizontal section of the implement as shown in Figure 6 taken along line 8—8;

Figure 9 is a view in side elevation similar to Figure 6 which is broken away to show the connection between the members; and Figure 10 is a view in front elevation showing the gripping means of the forked element.

Referring now to the drawings, Figures 1, 2, 3 and 4 show the implement of the present invention. It includes an L-shaped member 10 that is rectangular in cross section, a handle 12 is attached to one leg 11 of member 10.

Finger grips 13 are provided on the undersurface of handle 12. The distal end 15 of the other leg 14 has a raised knob 16 just prior to its termination. The tip 17 of distal end 15 is arranged to present a curved gripping surface 18 in the same direction as knob 16. Between knob 16 and tip 17, the leg 14 is cut out as at 19. The proximal end 20 of leg 14 is provided with a series of holes 21 longitudinally spaced.

A second member 30 is arranged to cooperate with member 10 in a manner to be described hereinafter. This member 30 has a head portion 31 and is bifurcated to form forked elements 32. Each element 32 has a ridge 33 on its top surface. Additionally, its distal end 34 has a raised knob 35 just prior to its termination. The tip 36 of distal end 34 is arranged to present a curved gripping surface 37 inwardly.

The head portion 31 of member 30 is slotted at 40 in order to receive leg 14 of member 10. Each side 41 of slot 40 is provided with a series of aligned holes 42 longitudinally spaced. The members 10 and 30 are connected together as shown in Figure 4. A pin 50 passes through a pair of aligned holes 42 in head portion 31 of member 10 and a hole 21 in the proximal end 20 of leg 14 of member 10. The pin 50 includes a shaft 51 having a knob 52 mounted at one end. The other end 53 of the pin 50 is provided with a groove 54 as shown in Figure 5. A spring clip 55 is mounted in the groove 54 by means of a screw 56. The clip 55 has a raised portion 57 that will lock the clip 55 in position.

In use an implement is taken in one of the hands of a laborer by means of handle 12. The implement is then lowered over a watermelon 100 in the manner indicated in Figure 2. Note that the forked elements 32 and the leg 11 are on diametrically opposite sides of watermelon 100 about its longitudinal axis. When in this position the implement is ready to raise or lift the watermelon 100. This is accomplished by merely lifting the handle 12 in a vertical direction. This vertical motion causes leg 14 to pivot toward forked elements 32 thereby cradling the watermelon 100 while firmly retaining it therein. The curved gripping surfaces 18 and 37 sustain the greater load inasmuch as they tend to press on the surface of the watermelon in a direction normal thereto. The surfaces 18 and 37 are curved to conform to the surface of the watermelon 100 so that use of the implement will not bring about injurious results. The knobs 16 and 35 tend to press on the surface of watermelon 100 in a direction nearly tangential thereto. Hence, the knobs 16 and 35 while rounded are, nevertheless, further restrained from causing further damage to watermelon 100 by reason of their configuration. In the manner above-described, a laborer can harvest and transport two watermelons at a time.

Figures 6 to 10 inclusive illustrate a modification of the implement of the present invention. It includes a curved somewhat L-shaped member 60 having a handle 62 at one end and a plate 64 mounted on its other end. The surface of this plate 64 is irregular as indicated at 66 and serves as a gripping surface. The member 60 is slotted as indicated at 68 about midway between its ends. The bottom 70 of the slot 68 is provided with a projection 72.

A second member 74 is arranged with member 60 and consists of a head portion 76 and bifurcated forked elements 78. The undersurface of head portion 76 is provided with teeth 80. The head portion 76 fits through slot 68 and the teeth 80 can be adjustably positioned on projection 72 by mating the teeth 80 with projection 72. The two members are thus removably and adjustably held together.

Each element 78 has mounted thereon a pair of pivoted units 82 each of which is pivotally connected to element 78 by a pin 84. Each pivoted unit 82 also includes a plate 86 the surface of which is irregular as indicated by 88. The irregular surfaces 88 of the pivoted units 82 serve as gripping surfaces.

In use the implement is positioned about a watermelon 100 as indicated in Figure 6 and a laborer grasps handle 62 with one of his hands to lift the watermelon 100 and transport it.

While this invention has been described in conjunction with a specific embodiment, nevertheless, various changes and modifications obvious to one skilled in the art are within the spirit, scope, and contemplation of the present invention.

We claim:

1. An implement for harvesting and transporting watermelons that comprises a curved member, a plate having a curved irregular surface mounted on one end of said curved member, the other end of said curved member constituting a handle, a second member having on one end a head portion and on the other end curved bifurcated elements laterally offset from said curved member, a pivoted unit mounted on each of said elements presenting an irregular surface facing the curved irregular surface of said curved member, said pivoted units being angularly offset from one another, and means for pivotally connecting said head portion to said curved member intermediate its ends so that a watermelon can be firmly retained between said curved surfaces when said handle is lifted.

2. An implement for harvesting and transporting watermelons that comprises a curved member, a plate having a curved irregular surface mounted on one end of said curved member, the other end of said curved member constituting a handle, a second member having on one end a head portion and on the other end curved bifurcated elements laterally offset from said curved member, a pivoted unit mounted on each of said elements presenting an irregular surface facing the curved irregular surface of said curved member, said pivoted units being angularly offset from one another, said curved member having a slot intermediate its ends, a projection located at the bottom of said slot, the under-surface of said head portion having teeth, said head portion being received in said slot and said teeth mating with said projection to form a pivotal connection so that a watermelon can be firmly retained between said curved surfaces when said handle is lifted.

3. An implement as defined in claim 1 wherein two pivoted units are mounted on each of said elements angularly offset one from the other.

4. An implement as defined in claim 2 wherein two pivoted units are mounted on each of said elements angularly offset one from the other.

SCOTT MOORE.
EDWARD J. MEYERS.
PATRICK R. NOLAN.

References Cited in the file of this patent

UNITED STATES PATENTS

| Number | Name | Date |
|--------|------|------|
| 546,913 | Botkin | Sept. 24, 1895 |
| 1,153,269 | Sturm | Sept. 14, 1915 |
| 1,365,196 | Richardson | Jan. 11, 1921 |
| 1,488,455 | Chase | Mar. 25, 1924 |
| 1,563,255 | Couch | Nov. 24, 1925 |
| 1,976,977 | Zinky | Oct. 16, 1934 |
| 2,490,467 | Payne | Dec. 6, 1949 |